United States Patent Office 3,478,021
Patented Nov. 11, 1969

3,478,021
3,3-SPIROPIPERIDINE DERIVATIVES OF BENZO-THIODIAZINE 1,1-DIOXIDES AND PROCESSES FOR THEIR PREPARATION
James M. Sprague, Gwynedd Valley, and Edward J. Cragoe, Jr., Lansdale, Pa., assignors to Merck & Co., Inc., Rahway, N.J., a corporation of New Jersey
No Drawing. Continuation-in-part of application Ser. No. 108,274, May 8, 1961. This application Nov. 24, 1964, Ser. No. 413,598
Int. Cl. C07d 99/32, 99/34
U.S. Cl. 260—243          10 Claims This application is a continuation-in-part of copending U.S. application Ser. No. 108,274, filed May 8, 1961, now abandoned.

This invention is concerned with novel spiro[2H-1,2,4-benzothiadiazine-3(4H),4'-piperidine]-7-sulfonamide 1,1-dioxides having an alkyl, alkenyl, alkynyl or cycloalkyl substituent attached to the 1-position of the piperidine ring; the piperidine nucleus being otherwise unsubstituted or having one or more lower alkyl groups attached to a nuclear carbon. When the piperidine nucleus has an alkyl substituent attached to each of the 2- and 6-position carbons, these alkyl groups can be linked together thus forming (with the piperidine nucleus to which they are attached) an N-substituted-nortropane structure. The invention also contemplates the physiologically acceptable salts and the 1'-quaternary ammonium derivatives (i.e., piperidinium salt).

The novel compounds of this invention also contain substituents attached to the benzenoid moiety. These include a sulfamoyl substituent and also at least one additional substituent selected from hydrogen, halogen or halogen-like radicals as chlorine, bromine, fluorine, iodine, trifluoromethyl, trichloromethyl, dichloromethyl and the like; lower alkyl as methyl, ethyl, propyl and the like or similar alkyl groups having a substituent, such as a halogen, attached to one or more of the carbons in the alkyl group; lower alkoxy, such as methoxy, ethoxy, propoxy, and the like; nitro or amino. The preferred compounds are those wherein the sulfamoyl substituent is attached to the 7-position of the benzothiadiazine nucleus and the other substituents are attached preferably to either or both of the 5- and or 6-positions.

The novel compounds of this invention possess antihypertensive activity as well as diuretic and/or saluretic properties and can be administered in conventional dosage forms either alone in the form of pills, capsules, tablets and the like or admixed with other therapeutically effective compounds in a single dosage form. The compounds are effective in lowering blood pressure and enhancing the excretion of sodium and chloride ions. While the dosage of the compounds will vary from compound to compound, and also, upon the age and condition of the patient, an average dosage of about 5 mg. to 2 g. of the novel compounds of this invention generally is effective in lowering the blood pressure and/or lowering the sodium chloride concentration of the blood. This dosage is well below their toxic dose and the compounds therefore are safe drugs for use in therapy of this type.

The novel compounds of this invention can be prepared by several methods. One method which has been found especially useful involves reaction of the appropriate amniobenzenedisulfonamide and the 1-substituted-4-piperidone with moderate heating. If desired, excess piperidone can be employed as a solvent, but where this is not feasible, another solvent such as dimethylformamide, diethylene glycol dimethyl ether, ethylene glycol dimethyl ether, dioxane and the like can be used.

Another very satisfactory method for the synthesis of these compounds involves the fusion of the appropriate aminobenzenedisulfonamide with an acid salt of the appropriate 1-substituted-4-piperidone.

The novel compounds of this invention not only can be prepared by reaction of the appropriate aminobenzenedisulfonamide with the appropriate piperidone but the said piperidone can be replaced by a reactive, functional derivative of the same, such as the corresponding ketal, enol ether or the ketimine or by a substance which under the reaction conditions in question is converted to the ketone, such as the hydrosulfite or cyanohydrin of the ketone and the reaction can be effected with or without an added solvent and with or without a catalyst, but preferably with heating.

The salts of these compounds can be prepared by the interaction of the end products obtained by any one of the above methods with an organic or inorganic acid. The quaternary ammonium salts can be prepared by interaction of the products obtained by one of the foregoing methods with alkyl halides, alkyl esters of sulfonic acid or with other known quaternizing agents.

Many of the intermediate disulfamoylaniline compounds are known. However, if a particular compound is unknown, it can be prepared by one or more of the methods described in U.S. Patents 2,809,194, 2,965,655, 2,965,656, 3,009,910, 3,060,178, 3,066,156 or 3,161,675, the disclosures of which are incorporated herein by reference.

Many of the intermediate 1-substituted-4-piperidone compounds also are known. If, however, a desired piperidone is unknown it can be prepared readily by one of the following methods.

Method 1.—Two moles of an ester of acrylic acid (which can be substituted, if desired) are allowed to react in alcohol with one mole of a properly substituted amine ($R^1NH_2$). The resultant diester is cyclized in benzene with sodium hydride to give a 2-alkoxycarbonyl-4-piperidone which is hydrolyzed and decarboxylated in hydrochloric acid solution.

Method 2.—A 1-methyl-4-piperidone

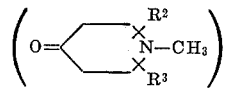

is quaternized with methyl iodide in alcohol. The 1-methyl-4-piperidone methiode obtained is allowed to react in water with an appropriately substituted amine ($R^1NH_2$) to give a 1-substituted-4-piperidone

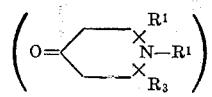

This method can be used with advantage to prepare 1-propargyl-2,5-dimethyl-4-piperidone.

Method 3.—A 4-piperidone

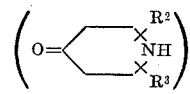

is heated with an appropriate halide ($R^1$-halide) to yield a 1-substituted-4-piperidone hydrohalide which upon treatment with strong base gives the 1-substituted-4-piperidone

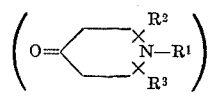

The preparation of representative compounds of this invention is described in more detail in the following examples wherein all melting points are corrected except where otherwise stated.

EXAMPLE 1

1'-methylspiro[2H-1,2,4-benzothiadiazine-3(4H),4'-piperidine]-7-sulfonamide 1,1-dioxide A solution of 4-amino-m-benezendisulfonamide (10.1 g., 0.04 mole) and 1-methyl-4-piperidone (6.8 g., 0.06 mole) in dimethylformide (30 ml.) is heated 18 hours on a steam bath. The product precipitates upon addition of water and is recrystallized from a mixture of dimethylformamide and water to yield 9.0 g. (65%) of 1'-methylspiro[2H-1,2,4 - benzothiadiazine - 3(4H),4'-piperidine]-7-sulfonamide 1,1-dioxide which melts at 218° C.

*Analysis.*—Calculated for $C_{12}H_{18}N_4O_4S_2$: C, 41.60; H, 5.24; N, 16.17. Found: C, 41.83; H, 5.59; N, 16.02.

EXAMPLE 2

1'-methyl-6 - chlorospiro[2H-1,2,4 - benzothiadiazine - 3(4H),4'-piperidine]-7-sulfonamide 1,1-dioxide 4-amino-6-chloro-m - benzenedisulfonamide (68.4 g., 0.24 mole) and 1-methyl-4-piperidone (40.8 g., 0.36 mole) are dissolved in dimethylformamide (180 ml.) and heated on a steam bath for 18 hours. The solution is cooled to 25° C. to give a 90% yield of 1'-methyl-6-chlorospiro[2H-1,2,4 - benzothiadiazine - 3(4H),4' - piperidine]-7-sulfonamide 1,1-dioxide which melts at 238.5° C.

*Analysis.*—Calculated for $C_{12}H_{17}ClN_4O_4S_2$: C, 37.84; H, 4.50; N, 14.71. Found: C, 38.14; H, 4.76; N, 14.62.

EXAMPLE 3

1',1'-dimethyl-6-chlorospiro[2H-1,2,4 - benzothiadiazine-3(4H),4'-piperidinium iodide]-7-sulfonamide 1,1-dioxide To a hot suspension of 1'-methyl-6-chlorospiro[2H-1,2,4-benzothiadiazine-3(4H),4'-piperidine] - 7 - sulfonamide 1,1-dioxide from Example 2 (30 g., 0.079 mole) in absolute methyl alcohol (1.1 liter) is added methyl iodide (100 ml., 0.16 mole) over a one hour period. The hot solution is stirred for one hour and cooled. The product is filtered, washed with methyl alcohol and dried to give 30.0 g. (72.5%) of 1',1'-dimethyl-6-chlorospiro[2H-1,2,4-benzothiadiazine-3(4H),4'-piperidinium iodide]-7-sulfonamide 1,1-dioxide which melts at 272° C.

*Analysis.*—Calculated for $C_{13}H_{20}ClIN_4O_4S_2$: C, 29.86; H, 3.86. Found: C, 30.03; H, 3.98.

EXAMPLE 4

1'-methyl-5-6-dichlorospiro[2H - 1,2,4-benzothiadiazine-3(4H),4'-piperidine]-7-sulfonamide 1,1-dioxide hydrochloride A solution of 4-amino-5,6-dichloro-m-benzene-disulfonamide (12.8 g., 0.04 mole) and 1-methyl-4-piperidone (6.8 g., 0.06 mole) in dimethylformamide (30 ml.) is heated on a steam bath for 18 hours. The dimethylformamide is distilled off at reduced pressure and the product is dissolved in ethanol and treated with an excess of 6 N hydrochloric acid, yielding 1'-methyl-5,6-dichloro[2H-1,2,4-benzothiadiazine-3(4H),4'-piperidine] - 7 - sulfonamide 1,1-dioxide hydrochloride which melts at 277° C. (dec.) after recrystallization from a mixture of 2-propanol and water.

*Analysis.*—Calculated for $C_{12}H_{17}Cl_3N_4O_4S_2$: C, 31.90; H, 3.76; N, 12.42. Found: C, 32.33; H, 4.21; N, 12.05.

EXAMPLE 5

1'-ethyl-6-chlorospiro[2H-1,2,4-benzothiadiazine-3(4H),4'-piperidine]-7-sulfonamide 1,1-dioxide A mixture of 4-amino-6-chloro-m-benzenedisulfonamide (17.1 g., 0.06 mole), 1-ethyl-4-piperidone (11.5 g., 0.09 mole) and dimethylformamide (50 ml.) is heated on a steam bath for 18 hours. The dimethylformamide is distilled off at reduced pressure, and the residue is poured into ice water (300 ml.). The material which separates is triturated with ethanol to give 12.0 g. (51%) of 1'-ethyl-6-chlorospiro[2H-1,2,4-benzothiadiazine - 3(4H),4'-piperidine]-7-sulfonamide 1,1-dioxide which melts at 223° C. after recrystallization from a mixture of dimethyl sulfoxide and water.

*Analysis.*—Calculated for $C_{13}H_{19}ClN_4O_4S_2$: C, 39.54; H, 4.85; N, 14.19. Found: C, 39.33; H, 5.10; N, 14.05.

EXAMPLES 6 THROUGH 11

By following substantialy the same procedure described in Example 5 and replacing the aminobenzene-disulfonamide reactant there employed by an equimolecular quantity of

| Example No. | Intermediate |
|---|---|
| 6 | 4-amino-6-trifluoromethyl-m-benzene-disulfonamide. |
| 7 | 4-amino-6-nitro-m-benzenedisulfonamide. |
| 8 | 4-amino-6-methyl-m-benzenedisulfonamide. |
| 9 | 4-amino-6-bromo-m-benzenedisulfonamide. |
| 10 | 4-amino-6-methoxy-m-benzenedisulfonamide. |
| 11 | 4-amino-6-fluoro-m-benzenedisulfonamide. | there is obtained, respectively:

| Example No. | Product Obtained |
|---|---|
| 6 | 1'-ethyl-6-trifluoromethylspiro[2H-1,2,4-benzothiadiazine-3(4H),4'-piperidine]-7-sulfonamide 1,1-dioxide. |
| 7 | 1'-ethyl-6-nitrospiro[2H-1,2,4-benzothiadiazine-3(4H),4'-piperidine]-7-sulfonamide 1,1-dioxide. |
| 8 | 1'-ethyl-6-methylspiro[2H-1,2,4-benzothiadiazine-3(4H),4'-piperidine]-7-sulfonamide 1,1-dioxide. |
| 9 | 1'-ethyl-6-bromospiro[2H-1,2,4-benzothiadiazine-3(4H),4'-piperidine]-7-sulfonamide 1,1-dioxide. |
| 10 | 1'-ethyl-6-methoxyspiro[2H-1,2,4-benzothiadiazine-3(4H),4'-piperidine]-7-sulfonamide 1,1-dioxide. |
| 11 | 1'-ethyl-6-fluorospiro[2H-1,2,4-benzothiadiazine-3(4H),4'-piperidine]-7-sulfonamide 1,1-dioxide. |

The 6-amino compound can be prepared either by the methods described in Examples 1, 2, 4 or 5 using equimolecular quantities of 4,6-diamino-m-benzenedisulfonamide and piperiodone reactants or by reducing the 6-nitro compound obtained by the process of Example 7. Reduction can be effected by dissolving the 6-nitro compound in alcohol and shaking in an atmosphere of hydrogen in the presence of platinum until hydrogen adsorption ceases. The catalyst can be removed by filtration and the solvents removed by drying in vacuo to give 1'-methyl-6-aminospiro[2H-1,2,4-benzothiadiazine - 3(4H),4'-piperidine]-7-sulfonamide 1,1-dioxide.

EXAMPLES 12 THROUGH 30

By following substantially the procedure described in Example 2, with the exception that the 4-piperidone reactant used in that example is replaced by an equimolecular quantity of:

| Example No. | Intermediate |
|---|---|
| 12 | 1-propyl-2,5-dimethyl-4-piperidone. |
| 13 | 1-isopropyl-4-piperidone. |
| 14 | 1-butyl-4-piperidone. |
| 15 | 1-isobutyl-4-piperidone. |
| 16 | 1-sec.butyl-4-piperidone. |
| 17 | 1-tert-butyl-3-methyl-4-piperidone. |
| 18 | 1-isoamyl-4-piperidone. |
| 19 | 1-isoamyl-2,5-dimethyl-4-piperidone. |
| 20 | 1-hexyl-2,5-dimethyl-4-piperidone. |
| 21 | 1-nonyl-2,5-dimethyl-4-piperidone. |
| 22 | 1-undecyl-2,5-dimethyl-4-piperidone. |
| 23 | 1-dodecyl-2,5-dimethyl-4-piperidone. |
| 24 | 1-allyl-2,5 dimethyl-4-piperidone. |
| 25 | 1-allyl-2,6-dimethyl-4-piperidone. |
| 26 | 1-(2-butenyl)-2,5-dimethyl-4-piperidone. |
| 27 | 1-propargyl-2,5-dimethyl-4-piperidone. |
| 28 | 1-cyclohexyl-3-methyl-4-piperidone. |
| 29 | 1-cyclohexyl-2,5-dimethyl-4-piperidone. |
| 30 | 3-tropanone. | there is obtained, respectively:

| Example No. | Product Obtained |
|---|---|
| 12 | 1'-propyl-2',5'-dimethyl-6-chlorospiro-[2H-1,2,4-benzothiadiazine-3(4H),4'-piperidine]-7-sulfonamide 1,1-dioxide. |
| 13 | 1'-isopropyl-6-chlorospiro-[2H-1,2,4-benzothiadiazine-3(4H),4'-piperidine]-7-sulfonamide 1,1-dioxide. |
| 14 | 1'-butyl-6-chlorospiro-[2H-1,2,4-benzothiadiazine-3(4H),4'-piperidine]-7-sulfonamide 1,1-dioxide. |
| 15 | 1'-isobutyl-6-chlorospiro-[2H-1,2,4-benzothiadiazine-3(4H), 4'-piperidine]-7-sulfonamide 1,1-dioxide. |
| 16 | 1'-sec-butyl-6-chlorospiro-[2H-1,2,4-benzothiadiazine-3(4H),4'-piperidine]-7-sulfonamide 1,1-dioxide. |
| 17 | 1'-tert-butyl-3'-methyl-6-chlorospiro-[2H-1,2,4-benzothiadiazine-3(4H),4'-piperidine]-7-sulfonamide 1,1-dioxide. |
| 18 | 1'-isoamyl-6-chlorospiro-[2H-1,2,4-benzothiadiazine-3(4H), 4'-piperidine]-7-sulfonamide 1,1-dioxide. |
| 19 | 1'-isoamyl-2',5'-dimethyl-6-chlorospiro-[2H-1,2,4-benzothiadiazine-3(4H),4'-piperidine]-7-sulfonamide 1,1-dioxide. |
| 20 | 1'-hexyl-2',5'-dimethyl-6-chlorospiro-[2H-1,2,4-benzothiadiazine-3(4H),4'-piperidine]-7-sulfonamide 1,1-dioxide. |
| 21 | 1'-nonyl-2',5'-dimethyl-6-chlorospiro-[2H-1,2,4-benzothiadiazine-3(4H),4'-piperidine]-7-sulfonamide 1,1-dioxide. |
| 22 | 1'-undecyl-2',5'-dimethyl-6-chlorospiro[2H-1,2,4-benzothiadiazine-3(4H),4'-piperidine]-7-sulfonamide 1-1-dioxide. |
| 23 | 1'-dodecyl-2',5'-dimethyl-6-chlorospiro-[2H-1,2,4-benzothiadiazine-3(4H),4'-piperidine]-7-sulfonamide 1,1-dioxide. |
| 24 | 1'-allyl-2',5'-dimethyl-6-chlorospiro-[2H-1,2,4-benzothiadiazine-3(4H),4'-piperidine]-7-sulfonamide 1,1-dioxide. |
| 25 | 1'-allyl-2',6'-dimethyl-6-chlorospiro-[2H-1,2,4-benzothiadiazine-3(4H),4'-piperidine]-7-sulfonamide 1,1-dioxide. |
| 26 | 1'-(2-butenyl)-2',5'-dimethyl-6-chlorospiro-[2H-1,2,4-benzothiadiazine-3(4H),4'-piperidine]-7-sulfonamide 1,1-dioxide. |
| 27 | 1'-propargyl-2',5'-dimethyl-6-chlorospiro-[2H-1,2,4-benzothiadiazine-3(4H),4'-piperidine]-7-sulfonamide 1,1-dioxide. |
| 28 | 1'-cyclohexyl-3'-methyl-6-chlorospiro-[2H-1,2,4-benzothiadiazine-3(4H), 4'-piperidine]-7-sulfonamide 1,1-dioxide. |
| 29 | 1'-cyclohexyl-2',5'-dimethyl-6-chlorospiro-[2H-1,2,4-benzothiadiazine-3(4H),4'-piperidine]-7-sulfonamide 1,1-dioxide. |
| 30 | 6-chlorospiro[2H-1,2,4-benzothiadiazine-3(4H),3'-tropane]-7-sulfonamide 1,1-dioxide. |

As the compounds of this invention are effective antihypertensive, diuretic and/or saluretic agents, they can be used for the treatment of high blood pressure with concomitant lowering of the sodium chloride blood levels.

The dosage of the novel compounds of this invention will vary over a wide range and for this reason tablets, pills, capsules and the like containing from about 5 mg. to about 2 g. of active ingredient can be made available to the physician for the symptomatic adjustment of the dosage to the individual patient. These dosages provide a very favorable therapeutic ratio as they are well below the toxic or lethal dose of the compounds covered by this invention.

As each of the compounds of this invention can be incorporated in a dosage form similar to that described in the following example or in other dosage forms suitable for oral or parenteral administration which can be prepared by well known methods, only one example is included herein to illustrate the preparation of a representative dosage form.

EXAMPLE 31

Dry-filled capsules containing 50 mg. of active ingredient per capsule

Per capsule, mg.
1'-ethyl-6-chlorospiro[2H - 1,2,4 - benzothiadiazine-3(4H)-4'-piperidine]-7-sulfonamide 1,1-dioxide___ 50
Lactose _____ 225
Capsule size No. 2.

The active ingredient is reduced to a number 60 powder. Lactose then is passed through No. 60 bolting cloth onto the powder. The combined ingredients are admixed for 10 minutes and then filled into No. 2 dry, gelatin capsules.

While the above examples describe the preparation of certain compounds which are illustrative of the novel compounds of this invention, and a certain specific dosage form suitable for administering the novel compounds, it is to be understood that the invention is not to be limited to the specific compounds described in the examples or by the specific reaction conditions described for the preparation of the compounds or by the specific ingredients included in the pharmaceutical preparation, but is to be understood to embrace variations and modifications thereof which fall within the scope of the appended claims.

What is claimed is:
1. A compound having the structure

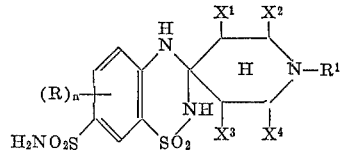

and the physiologically acceptable salts and quaternary ammonium derivatives thereof wherein
   R is attached to one of the positions 5, 6, and 5 and 6 and is selected from the group consisting of hydrogen, halogen, lower alkyl, halo-lower alkyl, lower alkoxy, nitro and amino;
   n is one of the numerals 1 and 2;
   $R^1$ is selected from the group consisting of alkyl of from 1 to about 15 carbons, lower alkenyl, lower alkynyl and cycloalkyl of 3 to 6 carbon atoms;
   $X^1$, $X^2$, $X^3$, and $X^4$ individually are selected from the group consisting of hydrogen and lower alkyl and $X^2$ and $X^4$ taken together alkylene of two carbon atoms.

2. 1' - alkyl-6-halospiro[2H - 1,2,4 - benzothiadiazine-3(4H),4'-piperidine]-7-sulfonamide 1,1-dioxide.

3. 1'-methyl - 6 - chlorospiro[2H - 1,2,4 - benzothiadiazine-3(4H),4'-piperidine]-7-sulfonamide 1,1-dioxide.

4. 1'-ethyl - 6 - chlorospiro[2H-1,2,4-benzothiadiazine-3(4H),4'-piperidine]-7-sulfonamide 1,1-dioxide.

5. 1'-alkyl-2',5'-di-lower alkyl - 6 - halospiro[2H-1,2,4-benzothiadiazine-3(4H),4'-piperidine]-7-sulfonamide 1,1-dioxide.

6. 1',1'-dialkyl-6-halospiro[2H - 1,2,4-benzothiadiazine-3(4H),4'-piperidinium halide]-7-sulfonamide 1,1-dioxide.

7. 1',1'-dimethyl-6-chlorospiro[2H-1,2,4 - benzothiadiazine-3(4H),4'-piperidinium chloride]-7-sulfonamide 1,1-dioxide.

8. 1'-alkenyl-6-halospiro[2H - 1,2,4 - benzothiadiazine-3(4H),4'-piperidine]-7-sulfonamide 1,1-dioxide.

9. 1'-alkynyl-6-halospiro[2H - 1,2,4 - benzothiadiazine-3(4H),4'-piperidine]-7-sulfonamide 1,1-dioxide.

10. 1' - cycloalkyl-2',5'-di-lower alkyl-6-halospiro[2H-1,2,4-benzothiadiazine-3(4H),4' - piperidine] - 7 - sulfonamide 1,1-dioxide wherein the cycloalkyl group has from 3 to 6 carbon atoms.

References Cited

UNITED STATES PATENTS 3,257,395    6/1966    Griot.

NICHOLAS S. RIZZO, Primary Examiner

U.S. Cl. X.R.

424—246